United States Patent [19]

Koch et al.

[11] Patent Number: 4,707,341

[45] Date of Patent: Nov. 17, 1987

[54] CATALYST FOR THE BURNING AND CONVERSION OF GASES AND HIGHER HYDROCARBONS, AND APPARATUS FOR THE REDUCTION OF NITRIC OXIDES AND AFTERBURNING OF EXHAUST GAS BY MEANS OF SUCH CATALYST

[75] Inventors: Christian Koch, Erlangen; Erwin Erdlen, Nuremberg, both of Fed. Rep. of Germany

[73] Assignee: Firma EVK Energietechnik Verfahrenstechnik Umwelttechnik, Pegnitz, Fed. Rep. of Germany

[21] Appl. No.: 879,642

[22] Filed: Jun. 27, 1986

Related U.S. Application Data

[62] Division of Ser. No. 669,552, Nov. 8, 1984, Pat. No. 4,613,583.

[30] Foreign Application Priority Data

Nov. 10, 1983 [DE] Fed. Rep. of Germany ....... 3340682
Apr. 3, 1984 [DE] Fed. Rep. of Germany ....... 3412289
Apr. 21, 1984 [DE] Fed. Rep. of Germany ....... 3415075

[51] Int. Cl.$^4$ .................... B01D 53/34; B01J 35/02; F01N 3/10; F01N 3/24
[52] U.S. Cl. .................... 422/171; 422/172; 422/177; 422/180; 422/182; 422/183; 422/192; 422/194; 422/211; 422/213.5
[58] Field of Search ............. 422/171, 172, 177, 180, 422/182, 183, 192, 193, 194, 211; 423/213.5; 502/303, 304, 252, 525

[56] References Cited

U.S. PATENT DOCUMENTS

| | | | |
|---|---|---|---|
| 3,492,098 | 1/1970 | De Palma et al. | 422/171 |
| 3,599,427 | 8/1971 | Jones et al. | 422/171 X |
| 3,867,312 | 2/1975 | Stephens | 423/213.5 X |
| 3,914,390 | 10/1975 | Kudo et al. | 502/251 X |
| 3,926,854 | 12/1975 | Whelan et al. | 423/213.5 X |
| 4,003,976 | 1/1977 | Komatsu et al. | 423/213.5 |
| 4,162,235 | 7/1979 | Acres et al. | 502/243 |
| 4,215,998 | 8/1980 | Futami | 502/303 X |
| 4,283,308 | 8/1981 | Ohara et al. | 502/213 |
| 4,483,940 | 11/1984 | Ono et al. | 502/159 |
| 4,528,279 | 7/1985 | Suzuki et al. | 502/252 X |
| 4,537,873 | 8/1985 | Kato et al. | 502/256 X |
| 4,613,583 | 9/1986 | Koch et al. | 502/252 |

Primary Examiner—Michael S. Marcus
Assistant Examiner—Lynn M. Kummert
Attorney, Agent, or Firm—Jordan and Hamburg

[57] ABSTRACT

The invention relates to a catalyst for the conversion of gases and higher hydrocarbons, which comprises an active metal coating containing lanthanum and cobalt as active metal components on a porous oxidic support substance, wherein the coating is formed by impregnating the support substance with a solution of thermally easily decomposable lanthanum and cobalt salts and subsequently baking, whereby the metal coating contains 1 part cobalt and 1–3 parts, preferably 2 parts, lanthanum, as well as 2 to 20 weight percent of cerium based on the sum of these materials.

14 Claims, 6 Drawing Figures

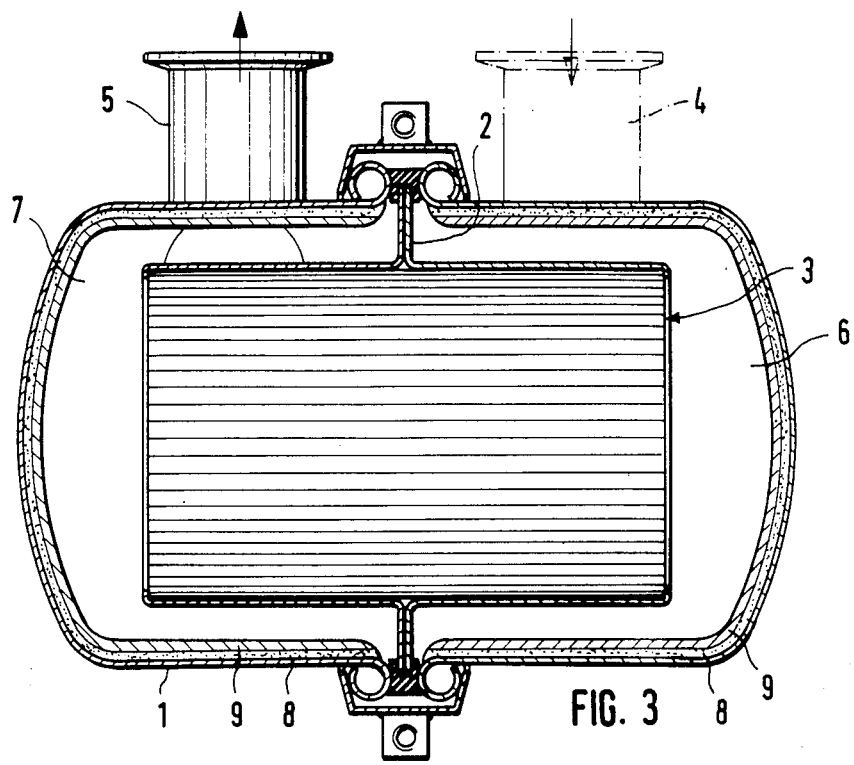
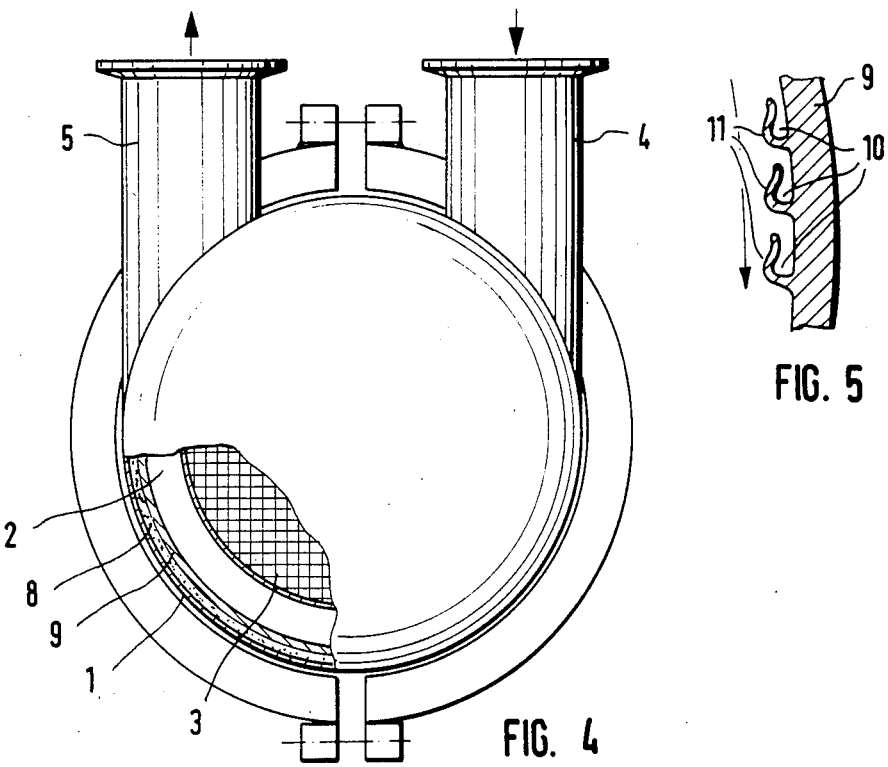
FIG. 3
FIG. 4
FIG. 5

CATALYST FOR THE BURNING AND CONVERSION OF GASES AND HIGHER HYDROCARBONS, AND APPARATUS FOR THE REDUCTION OF NITRIC OXIDES AND AFTERBURNING OF EXHAUST GAS BY MEANS OF SUCH CATALYST

This is a division of application Ser. No. 669,552, filed Nov. 8, 1984, now U.S. Pat. No. 4,613,583.

FIELD OF THE INVENTION

The invention relates to a catalyst for the conversion of gases and higher hydrocarbons which is provided with an active metal coating containing lanthanum and cobalt as active metal components on a porous oxidic support material, wherein the coating is formed by impregnating the carrier substance with a solution of thermally easily decomposable lanthanum and cobalt salts and subsequent baking. The invention also relates to an apparatus for the reduction of nitric oxides and an exhaust gas afterburner using such catalyst.

BACKGROUND OF THE INVENTION

Up to now, the burning processes in the conversion of hydrocarbons, has always led only to an incomplete burning and conversion, whereby there resulted problems with carbon monoxide, unburned hydrocarbons, soot and other harmful materials, such as, for instance, nitric oxides. In order to avoid these difficulties, it has already been proposed to perform the burning in the bores of a ceramic, which is coated with a catalyst. In order to prolong the working life of the catalyst, it has to be coated on a porous ceramic carrier, so that on the other side, by means of correspondingly large surfaces, a complete conversion of the mixture flowing through it, is accomplished. This is preferably done in perforated stone plates or a honeycombed ceramic, however, also on ceramic substances shaped, for instance, like pellets, cylinders and filaments.

In order to perform this task, recently mainly substances containing platinum have been applied as catalysts which have the disadvantage, however, that platinum quickly becomes "poisoned" and therefore is ineffective due to impurities of the hydrocarbons to be burned, especially, for instance, soot and $SO_2$, in the case of afterburning of motor vehicle exhaust gases.

Difficulties also arise with the utilization of a catalyst which has become known from the German Pat. No. 22 10 365, wherein a mixture of cobalt, lanthanum, nickel and uranium is provided as an active metal coating on a porous ceramic carrier, whereby the components, however, are finally always present as oxides. For the purpose of simplification, in the following, reference will be made only to the active metal components (which are contained in the oxides). Extensive tests, upon which the present invention is based, have proven that the therein proposed substances cannot be continuously utilized as a catalyst, because the nickel portion, as well as the uranium, in the long term causes the destruction of the catalyst because of a reaction with the ceramic carrier and its break-down, especially because of multispinel formation. The indicated extensive mixing ratio ranges of cobalt and lanthanum, to a large extent, do not result in a suitable catalyst, because if the ratio between a lanthanum nitrate portion and a cobalt nitrate portion is decreased during the impregnation of the carrier substance, the excess cobalt oxide very quickly escapes during workup of the catalyst and poisoning occurs. This "poisoning" of the catalyst results especially at higher temperatures, not only in the case of the above mentioned cobalt-lanthanum-nickel-uranium mixture, but also in the case of substances containing platinum, so that such catalysts, for instance, for the afterburning of combustion gases or exhaust gases of motor vehicles, have to be positioned in the cooler sections, far behind the burning device or engine. This has the disadvantage, however, that the conversion cannot be as complete as it would be at higher temperatures.

The object of the invention is to provide a catalyst for the conversion of hydrocarbons, which is stable and thoroughly insensitive to poisoning not only by harmful foreign materials, but also to self-poisoning at higher temperatures, and which also makes possible the reduction or conversion of harmful nitric oxides.

SUMMARY OF THE INVENTION

According to the invention, for solving this problem a catalyst of the afore-mentioned kind is provided in which the metal coating contains 1 part cobalt and 1–3 parts—preferably 2 parts—lanthanum, as well as—based on the sum of these materials—2 to 20 weight percent cerium.

By omitting the conventional catalytic components nickel and uranium, and including the additional metal cerium for stabilizing the catalyst, this particular composition surprisingly results in a catalyst which is so temperature stable that, depending on gas composition and function, it can be utilized in reducing atmosphere of up to 1000° C. and in oxidizing atmosphere even up to 1200° C. This makes it possible, for instance, to utilize the catalyst as an afterburner for diesel engines, whereby the catalyst, because of its high temperature stability, can be placed immediately after the engine in the area where the exhaust gas temperature is highest, in order to achieve the highest possible reaction rate of soot conversion. The exhaust gas is thereby preferably supplied on the side into a cyclone-shaped ring chamber, from this turned at right angles, through the catalyst having a multitude of plates arranged one after the other, or is led into an extruded honeycombed substance (monolith) and led off to the outside at the other perpendicular end again through a cyclone-shaped ring chamber.

In the particular application of the catalyst for the burning of soot, it has furthermore proved to be advantageous, that based on the cobalt and lanthanum content, the metal coating additionally contains approximately 2 to 20 weight percent iron.

Whereas in the conventionally known catalysts the entire support substance consists of a particular porous, oxidic material, according to the invention, a carrier having two components is used, consisting of a base substance, preferably cordierite, which is resistant to temperature changes, which is provided with a porous coating consisting of a mixture of aluminium oxide and magnesium oxide. By means of this carrier of two components, wherein the base substance is not porous, it is avoided that the main part of the catalytic substance enters into the inside of the porous carrier ceramic, in which there does not occur any conversion worth mentioning. Therefore, the porous ceramic is provided with its catalytic surface coating only in the form of a thin layer on the basic substance, so that, in effect, a very high conversion of the components to be burned can take place, without having to make the portion of the catalytic substance too high. Furthermore, a carrier of two components advantageously avoids the formation of soot deep inside of the porous substance, which could lead to a rupture of the carrier.

For the production of a catalyst according to the invention, the carrier substance is impregnated preferably with an aqueous solution of cobalt, lanthanum, cerium, and if necessary, iron salts, preferably the nitrates thereof. The impregnated carrier substance is dried at approximately 100° C. and subsequently is brought into air or reducing atmospheres at temperatures between 200° C. and 1000° C. From this manufacturing process, it becomes clear that the active metal components, of course, are present as oxides, specifically as lanthanum-cobaltite $LaCoO_3$.

In order to further increase the effectiveness of such exhaust gas catalysts—especially during the cold start phase—in an additional development of the invention, it is provided that the inside wall of the housing is at least partially lined with a ceramic layer coated with a catalyst.

The additional utilization of a ceramic lining coated with catalyst, preferably of the same ceramic as that of the honeycombed body mounted in the housing which is permeated with exhaust gas, and preferably also coated with the same active catalytic metal oxide, especially in conjunction with a roughening of the surface of the ceramic lining so that undercut pockets are formed in the direction of the flow of the exhaust gases, leads to soot accumulation which is of special importance during the critical cold start phase. It has been shown that especially during the cold start phase, because of their small size in relation to the diameters of the channels of the honeycombed structure, soot particles, to a large extent, rush through these channels without touching the wall, so that the desired catalytic conversion cannot take place. This difficulty is allayed in two ways by the ceramic lining coated with catalyst. On the one hand, during the cold start phase, when the conditions for the catalytic conversion of the soot are still unfavorable, the soot is stored in the fissured pockets of the ceramic lining. Furthermore, the catalytic conversion of the soot takes place also on the catalytic surface coatings—surface coatings here refers to a covering of all the fine pores of the ceramic carrier substance, so that even by mechanical rubbing of its surface, there is always available more catalyticcoated material.

Because of the practically unavoidable wall collisions of the soot particles with the ceramic layer coated with catalyst, the catalytic conversion of soot is especially great when the ceramic honeycombed structure (or a multitude of perforated plates arranged in series) penetrates a central separation wall of the housing, as provided in a further development of the invention, wherein the exhaust gas intake and discharge connection is positioned laterally on the housing, thus forming cyclone-shaped ring chambers. By means of this gas turn into the cyclone-shaped intake chamber and the also cyclone-shaped exhaust chamber of the housing with a 90° turn between the inlet- and outlet-flow direction as against the flow-through direction in the catalyst, due to centrifugal force, there necessarily result increased forced collisions with the lining layer of the housing, whereby is improved not only the mentioned storage of soot during the cold start phase, but also the possibility of a catalytic conversion on the coating of the lining layer.

It is besides further in the scope of the invention to insert a layer of mineral wool, especially aluminium oxide wool, between the ceramic layer and the housing, and furthermore, as is conventionally known, not to mount the catalytic active metal coating immediately on the ceramic support material, but on a commonly called "washcoat" carrier layer. Such washcoat carrier layers can consist, for instance, of a thermally decomposable porous aluminium oxide layer, or metal oxide, or the like, which ensures a better adhesion of the active metal coating than the clean carrier ceramic.

In a further embodiment of the invention, for the formation of the undercut pockets for improved soot storage, it is provided that, by means of a notching tool, the surface of the ceramic layer in the gummy state is provided with projections which are bent away from the flow-through direction by partially withdrawing and rotating the notching tool.

The utilization of the catalyst according to the invention is thereby not to be limited to the afterburning of motor vehicle exhaust gases, and certainly not to the afterburning of soot for diesel engines. The catalyst according to the invention can be successfully utilized for all cases of hydrocarbon conversions, be it in heating apparatus for heating buildings, or in apparatus for the conversion of hydrocarbons into cracked gas or the like. Especially the high temperature stability of the catalyst and its low susceptibility to self-poisoning or poisoning by impurities of the combustion material, qualify it as a universally utilizable catalyst. The high temperature resistance is thereby of special importance, because it permits working at high temperatures, at which the conversion takes place correspondingly faster, so that it safely ensures a complete conversion of the particular fuel.

It is known that inhomogeneous flames above 900° C., as well as homogeneous conversions in ceramics above 1300° C. produce nitric oxides. In the primary flue gas stream of combustion apparatus, they are present at up to 95% as NO and up to 5% as $NO_2$. In the course of flue gas handling, the $NO_2$ content increases further due to afteroxidation.

For the decontamination of the exhaust gases, i.e. for the reduction of the nitric oxides to nitrogen, it has already been proposed to treat the gas to be purified with ammonia as a reducing agent and to let the conversion take place in the presence of a catalyst. As catalyst, up to now, mainly Ni, Cr, Cu and V, as well as platinum-containing metal coatings on a ceramic carrier have been used.

Japanese publications indicate that the conversion takes place between 300° C. and 400° C. with ammonia at approximately 100 kg catalyst/MW. Thereby, in the stoichiometric case more than 70 moles $NH_3$ are used, thus more than 1.2 kg/h/MW. The utilization of ammonia results from the selectivity of this material together with the catalyst for the conversion of the nitric oxides.

The catalysts known up to now also have the disadvantage that, on the one hand, they are inactive, which—as mentioned above—requires the utilization of ammonia as reducing agent, or easily "poison" themselves during operation, as is the case with catalysts containing platinum, i.e., they lose their catalytic effectiveness due to accumulations of harmful substances.

It has now been shown that the above described preferred utilizable catalyst for the conversion of hydrocarbons is not only extraordinarily favorable for preventing the occurrence of nitric oxides but, on the basis of this special effectiveness, it is also extraordinarily advantageous as catalyst for the catalytic reduction of nitric oxides, where it can be utilized particularly in the conversion of fossil fuels, whereby the gas to be purified is mixed with an added reducing agent and flows through a catalyst, in which a porous, oxidic carrier substance is provided with an active catalytic metal or metal oxide coating.

This special effectiveness of the catalyst according to the present invention for $DeNO_x$ systems allows also the utilization of hydrogen or carbon compounds, especially carbon monoxide instead of, or in addition to ammonia as reducing agent. This allows the construction of $DeNO_x$ systems, i.e. of purification apparatus for the decontamination of exhaust gases of the therein contained nitric oxides, whereby natural gas, or also cracked gas, is utilized as reducing agent. The cracked gas itself can thereby preferably be produced by catalytic partial conversion either from natural gas or oil, whereby for this catalytic partial conversion preferably again the same, above mentioned catalyst can be utilized for the gasification reaction. In the case of direct utilization of natural gas, the therein contained hydrogen becomes active, first of all, for the $NO_x$ reduction. In the case of the utilization of the carbon contained in the natural gas as a reducing agent, the amount of the reducing agent necessary for the decontamination, i.e. the amount of the natural gas, can be further decreased. This cracking of the carbon portion takes place with the help of a cracked gas producer means, in which the natural gas, or also oil, is partially converted catalytically. Besides the cost reduction of operating materials, utilization of natural gas or cracked gas instead of ammonia results also in a simplification of the apparatus, because it no longer requires an ammonia tank. Thus, there no longer are any safety and transportation problems with ammonia.

Further advantages, characteristics and features of the invention appear from the following description of a few exemplified embodiments, as well as from the drawings.

BRIEF DESCRIPTION OF THE DRAWINGS

FIG. 3 is a longitudinal section through a modified, improved embodiment of an exhaust gas catalyst for diesel engines;

FIG. 4 is a partially cut away front view of the exhaust gas catalyst according to FIG. 3;

FIG. 5 is an enlarged partial section through the surface of the ceramic lining of the exhaust gas catalyst provided with pockets for catching soot according to FIGS. 3 and 4.

DETAILED DESCRIPTION OF THE INVENTION

Figure 1:
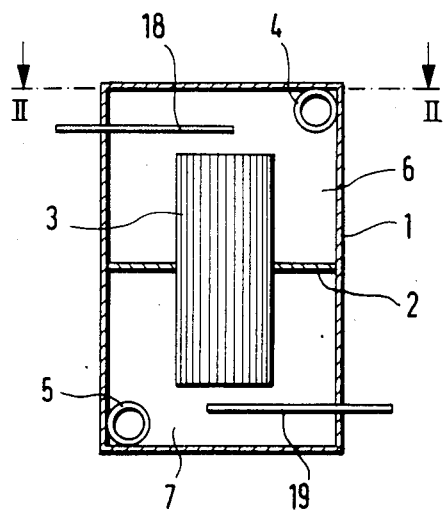
FIG. 1 is a longitudinal section through a schematically shown exhaust gas catalyst for the afterburning of soot for diesel engines.
Figure 2:
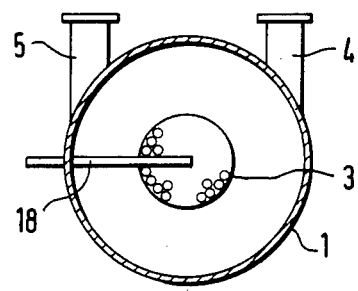
FIG. 2 is a cross section through the exhaust gas catalyst according to FIG. 1.

FIGS. 1 and 2 schematically show a longitudinal, and respective cross sectional view of an exhaust gas afterburner for diesel engines according to the invention. In the essentially cylindrical housing 1, penetrating a separation wall 2, is positioned the actual support structure 3, which consists of plates placed one after the other or is in the shape of an extruded honeycombed substance (monolith), wherein the surfaces of the conduits extending through it are coated with the above described catalytic substance. The upper side intake 4, which is connected to the exhaust train of the engine, opens tangentially into the upper ring chamber 6, while the discharge pipe 5 leads in the same way tangentially out of the lower ring chamber 7. It has been shown that by means of the cyclonic guiding of the exhaust gas, there results a better deposition and burning of the soot particles. The configuration of the intake and exhaust pipes 4 and 5 can thereby also be reversed, so that, for instance, the intake pipe is on the bottom.

Sensors 18 and 19 schematically indicate thermal sensors which serve to monitor the intake and exhaust temperatures. On the instrument panel of the motor vehicle is provided a suitable temperature indication instrument comprising three indication fields. The position of the hand, or of another suitable indication element, in the first field, indicates that the discharge temperature is lower than the intake temperature. This is the case at the start, when the catalyst is not yet warm enough to effect the conversion and afterburning, especially of soot particles, which leads to an increase of the temperature in the exhaust chamber 7 with reference to the exhaust gas temperature in the intake chamber 6. At correct functioning of the exhaust gas afterburner, the exhaust temperature in the chamber 7 has to be greater than the intake temperature, which corresponds to the position of the hand in the second (middle) indicator field. The third field signalizes the case, however, that the exhaust temperature is much greater than the intake temperature. This, in turn, signalizes that something is not working in the engine, for instance, that a cylinder is not functioning, resulting in that the exhaust gas does not contain only small amounts of components to be afterburned, but instead, a part of the fuel itself is present, so that overheating takes place in the afterburner. If the hand is positioned in this third field, it therefore signalizes engine damage which has to be corrected, not only for the sake of the engine itself, but also for the protection of the afterburner.

The modified, improved exhaust gas catalyst with soot afterburner according to FIGS. 3 to 5, comprises an outer metal housing 1, essentially configured as a cylindrical container, and a catalyst 3 in the form of a ceramic honeycombed structure having a catalytically active metal oxide coating. The catalyst is positioned on the longitudinal axis of the housing, penetrating a central separation wall 2. The gas intake connection 4, which is connected to the exhaust of the engine, and the gas exhaust connection 5 leading to the muffler and to the exhaust pipe, are respectively located laterally on the housing, so that cyclone-shaped intake and exhaust chambers 6, 7 are formed, in which the intake and exhaust directions of the gas are turned respectively by 90° into the longitudinal direction of the honeycombed substance 3, and wherein the intake preferably contains a gas acceleration device, for instance, in the form of a venturi tube, which accelerates the flow in the ring chamber. The inside wall of the housing is lined with a ceramic layer 9 with an interposed aluminium oxide wool interfacing 8, consisting of the same ceramic material as the honeycombed body 3, and provided with the same active catalytic coating or impregnation. The surface of the ceramic lining is provided with pockets 10—forming baffles 11 bent in a direction opposite to the flow of the exhaust gases in the cyclone chambers 6, 7, as shown in the enlarged section of FIG. 5. Especially during the cold start phase, these pockets 10 catch the soot which is catalytically converted after the ceramic material heats up to the operating temperature. In order to facilitate the installation of the ceramic honeycombed body, i.e., of the actual catalyst, and in order to allow a simple covering of the housing with the ceramic layer, the housing 1 is divided lengthwise, i.e., it consists of two half-shells which are screwed together or, if necessary, are welded together.

The invention is not limited to the represented embodiment. Important for the improvement of the effectiveness of the exhaust gas catalyst according to the invention, especially for diesel engines, is the fact, that in the intake and exhaust chambers, there takes place a turn of the gas flow from the flow direction of the intake or exhaust into the flow-through direction of the catalyst, and that the inside wall is at least partially lined with a catalytically active ceramic layer which stores soot.

Figure 6:
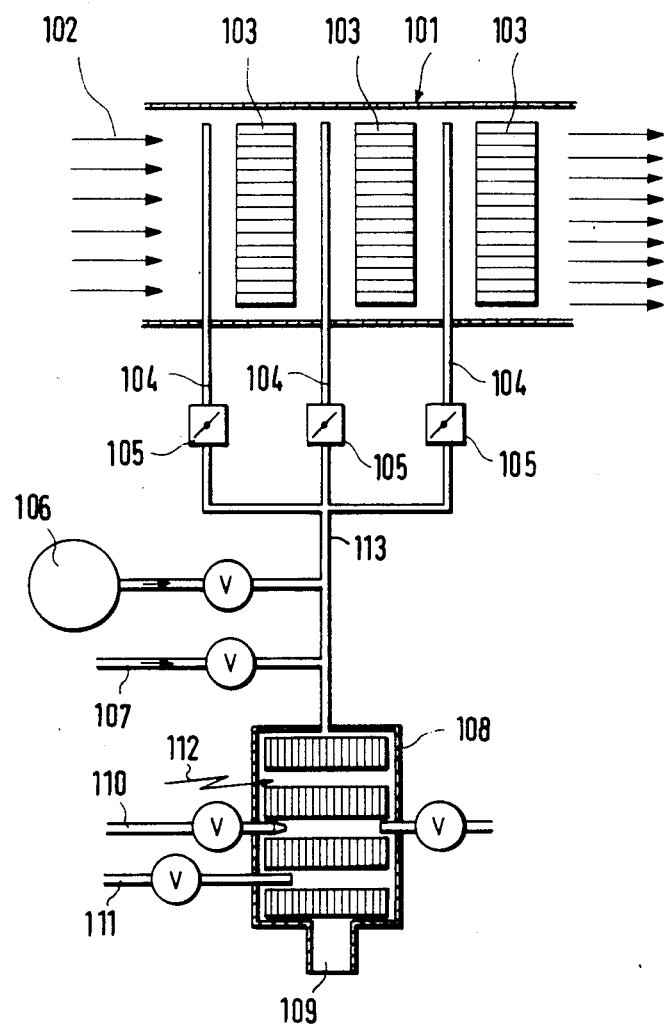
FIG. 6 is a schematic representation of the structure of a $DeNO_x$ apparatus for the reduction of nitric oxide by means of the catalyst according to the invention.

Reactor 101 in FIG. 6 indicates a reactor of a DeNO$_x$ apparatus for the reduction of nitric oxide, through which flows the stream of flue gas 102, one or more ceramic support substances 103 being arranged in the reactor, preferably configured as a type of honeycombed structure and having surfaces coated with the specific catalyst described in the claims. Instead of flue gas, which is contaminated with NO$_x$, i.e., with nitric oxides of various oxidation stages, by means of such reactor 101, there could, of course,, be purified also any other gas containing nitric oxide impurities. The flue gas containing nitric oxide impurities may be provided with a reducing agent, which can be supplied before the catalysts 103 via separate intakes 104 for the reducing agent provided with dosage valves 105. These intakes 104 for the reducing agent are connected to a common supply line 113, which can be connected as desired either to an ammonia tank 106, to a natural gas supply line 107, or also to a cracked gas producer means 108, in which oil or natural gas is partially converted catalytically, so that an increased portion of CO is produced, which serves as reducing agent for the DeNO$_x$ reaction in the reactor 101. The cracked gas producer means, in addition to the air intake 109, comprises the oil supply line 110 and a gas supply line 112, as well as a multitude of catalytic substances, which are schematically suggested only as boxes, which can be similarly constructed as the catalysts 103 of the DeNO$_x$ converter. The catalytic conversion of oil or natural gas into cracked gas can thereby take place even by the utilization of the same active catalytic material, i.e., the specific lanthanum-cobalt metal oxide coatings, as proposed for the DeNO$_x$ reaction.

In further embodiment of the invention, an especially hard material, such as, for instance, the already mentioned cordierite, can be utilized as carrier material for the active metal coating, however, it should be made especially porous, in order to ensure a complete impregnation of the material with the solution of lanthanum and cobalt salts, or, generally expressed, the salts forming the active metal coating layer. The catalytic substance is thereby made in two stages. In the first stage, by means of impregnation, a salt containing Al or Al and Mg is put into the finely porous material, and subsequently is thermally or chemically decomposed. This results in the formation of a catalytic support coating of $\gamma$- or $\alpha$-Al$_2$O$_3$, or a spinel of MgO and Al$_2$O$_3$ (washcoat), upon which the catalyst is then impregnated in a second step. This is especially important in the utilization of such catalyst for the decontamination of flue gases of combustion apparatus, for instance, of generating stations, because these exhaust gases contain solid material impurities, which cause erosion and wear and tear of the catalytic material. Therefore, it is not sufficient if only the axial bores of the gas flow-through of a ceramic substance are provided with the catalytic surface coating. The catalytic coating has to be highly dispersed in the fine micropores of the material, so that despite the erosion of the carrier material, new catalytically active material continuously reaches the surface.

We claim:

1. An apparatus for the catalytic reduction of nitric oxides contained in a gas comprising:
    a reactor;
    means for introducing gas containing nitric oxides into he reactor;
    means for introducing a reducing agent into the reactor;
    a porous oxidic carrier material arranged in the reactor, aid porous oxidic carrier material being coated with an active; catalytic metal or metal oxide coating containing 1 part cobalt, 1 to 3 parts lanthanum, 2 to 20 weight percent cerium, and 2 to 20 weight percent iron, said percentages being based on the sum of cobalt and lanthanum; and
    means for withdrawing catalytically reduced gas from the reactor.

2. An apparatus as in claim 1, wherein the porous oxidic carrier material is impregnated throughout with the active catalytic metal or metal oxide coating.

3. An apparatus as in claim 1, further comprising an adhesive support layer between the porous oxidic carrier material and the active catalytic metal or metal oxide coating.

4. An apparatus as in claim 1, further comprising ammonia supply means connected to the reducing agent introducing means for supplying ammonia as the reducing agent.

5. An apparatus as in claim 1, further comprising natural gas supply means connected to the reducing agent introducing means for supplying natural gas as the reducing agent.

6. An apparatus as in claim 1, further comprising carbon monoxide supply means connected to the reducing agent introducing means for supply carbon monoxide as the reducing agent.

7. An apparatus as in claim 1, further comprising hydrogen supply means connected to the reducing agent introducing means for supplying hydrogen as the reducing agent.

8. An apparatus as in claim 1, wherein the porous oxidic carrier material comprises a plurality of ceramic supports arranged in the reactor in a honeycombed structure, 9. An apparatus as in claim 8, wherein the means for introducing a reducing agent into the reactor comprises a plurality of intake lines, each intake line supplying reducing agent in the vicinity of one of the plurality of ceramic supports, and a dosage valve in each intake line for regulating the dosage of reducing agent supplied through the intake line.

10. An apparatus as in claim 1, wherein said porous oxidic carrier material is a base substance stable to temperature provided with a porous layer of a mixture of aluminum oxide and magnesium oxide.

11. An apparatus as in claim 10, wherein said base substance s cordierite.

12. An apparatus as in claim 1, further comprising cracked gas production means connected to the reducing agent introducing means for supplying cracked gas as the reducing agent.

13. An apparatus as in claim 12, wherein the cracked gas production means comprises a second reactor, an oil supply line for supplying oil to the second reactor, a gas supply line for supplying natural gas to the second reactor, means for supplying air to the reactor and a plurality of catalytic elements situated in the second reactor, whereby the oil or natrual gas is partially catalytically converted to produce cracked gas having an increased carbon monoxide content.

14. An apparatus as in claim 13, wherein each of the plurality of catalytic elements comprises a porous oxidic carrier material coated with an active catalysti metal or metal oxide coating containing 1 part cobalt, 1 to 3 parts lanthanum, 2 to 20 weight percent cerium, and 2 to 20 weight percent iron, said percentages being based on the sum of cobalt and lanthanum.

* * * * *